(12) United States Patent
Shioiri et al.

(10) Patent No.: US 10,677,297 B2
(45) Date of Patent: Jun. 9, 2020

(54) SELECTABLE ONE-WAY CLUTCH

(71) Applicants: TOYOTA JIDOSHA KABUSHIKI KAISHA, Toyota-shi, Aichi-ken (JP); Means Industries, Inc., Saginaw, MI (US)

(72) Inventors: Hiroyuki Shioiri, Yokohama (JP); Hiroyuki Shibata, Odawara (JP); Shotaro Kato, Shizuoka (JP); Mitsuaki Tomita, Susono (JP); Yuki Kurosaki, Susono (JP); Joshua D. Hand, Midland, MI (US)

(73) Assignees: TOYOTA JIDOSHA KABUSHIKI KAISHA, Toyota-shi (JP); Means Industries, Inc., Saginaw, MI (US)

( * ) Notice: Subject to any disclaimer, the term of this patent is extended or adjusted under 35 U.S.C. 154(b) by 182 days.

(21) Appl. No.: 15/843,974

(22) Filed: Dec. 15, 2017

(65) Prior Publication Data
US 2018/0231072 A1 Aug. 16, 2018

Related U.S. Application Data

(60) Provisional application No. 62/457,469, filed on Feb. 10, 2017.

(51) Int. Cl.
*F16D 41/12* (2006.01)
*F16D 41/14* (2006.01)

(52) U.S. Cl.
CPC ........... *F16D 41/125* (2013.01); *F16D 41/14* (2013.01)

(58) Field of Classification Search
CPC .......... F16D 41/12; F16D 41/14; F16D 41/16; F16D 41/30; F16D 41/125; F16D 41/084
See application file for complete search history.

(56) References Cited

U.S. PATENT DOCUMENTS 2,947,537 A 8/1960 Littell et al.
2,959,062 A 11/1960 Looker
(Continued)

FOREIGN PATENT DOCUMENTS

WO 2016168075 A1 10/2016

OTHER PUBLICATIONS

International Searching Authority, International Search Report and the Written Opinion for International Application No. PCT/US2018/33604, dated Aug. 24, 2018.

*Primary Examiner* — David R Morris
*Assistant Examiner* — James J Taylor, II
(74) *Attorney, Agent, or Firm* — Hunton Andrews Kurth LLP (57) ABSTRACT

A selectable one-way clutch includes: a pocket plate including accommodating recess portions; a notch plate including engaging recess portions; a plate-shaped engaging piece; and a selector plate configured to switch between: a state in which the engaging piece rises toward the notch plate; and a state in which the engaging piece is accommodated in the accommodating recess portion. The notch plate includes a plane portion including a first inclined surface, and the first inclined surface provides the engaging piece with force in a direction into which the engaging piece is urged away from the notch plate, when the notch plate is rotated in an engaging direction into which the engaging piece rising toward the notch plate is engaged with the engaging recess portion, and one end portion of the engaging piece rises toward the notch plate and comes in contact with the plane portion.

4 Claims, 6 Drawing Sheets

(56) References Cited

U.S. PATENT DOCUMENTS

| | | |
|---|---|---|
| 4,050,560 A | 9/1977 | Torstenfelt |
| 4,340,133 A | 7/1982 | Biersch |
| 4,651,847 A | 3/1987 | Hermanns |
| 5,927,455 A | 7/1999 | Baker et al. |
| 6,193,038 B1 | 2/2001 | Scott et al. |
| 6,244,965 B1 | 6/2001 | Klecker et al. |
| 6,290,044 B1 | 9/2001 | Burgman et al. |
| 6,571,926 B2 | 6/2003 | Pawley |
| 6,607,292 B2 | 8/2003 | Gutierrez et al. |
| 6,905,009 B2 | 6/2005 | Reed et al. |
| 7,198,587 B2 | 4/2007 | Samie et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,484,605 B2 | 2/2009 | Pawley et al. |
| 7,491,151 B2 | 2/2009 | Maguire et al. |
| 7,643,801 B2 | 1/2010 | Piirainen |
| 7,743,678 B2 | 6/2010 | Wittkopp et al. |
| 7,766,790 B2 | 8/2010 | Stevenson et al. |
| 7,942,781 B2 | 5/2011 | Kimes |
| 7,992,695 B2 | 8/2011 | Wittkopp et al. |
| 8,051,959 B2 | 11/2011 | Eisengruber |
| 8,061,496 B2 | 11/2011 | Samie et al. |
| 8,079,453 B2 | 12/2011 | Kimes |
| 8,087,502 B2 | 1/2012 | Samie et al. |
| 8,196,724 B2 | 6/2012 | Samie et al. |
| 8,272,488 B2 | 9/2012 | Eisengruber et al. |
| 8,286,772 B2 | 10/2012 | Eisengruber |
| 8,602,187 B2 | 12/2013 | Prout |
| 8,844,693 B2 | 9/2014 | Pawley |
| 9,121,454 B2 | 9/2015 | Pawley |
| 9,188,170 B2 | 11/2015 | Prout et al. |
| 9,188,174 B2 | 11/2015 | Beiser et al. |
| 9,377,061 B2 | 6/2016 | Kimes et al. |
| 2004/0238306 A1 | 12/2004 | Reed et al. |
| 2006/0185957 A1 | 8/2006 | Kimes et al. |
| 2007/0034470 A1 | 2/2007 | Fetting, Jr. et al. |
| 2007/0278061 A1 | 12/2007 | Wittkopp et al. |
| 2008/0000747 A1 | 1/2008 | Saka |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0018795 A1 | 1/2010 | Samie et al. |
| 2010/0022342 A1 | 1/2010 | Samie et al. |
| 2010/0025594 A1 | 2/2010 | Nukatsuka et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0177900 A1 | 7/2011 | Simon |
| 2011/0183806 A1 | 7/2011 | Wittkopp et al. |
| 2011/0192697 A1 | 8/2011 | Prout et al. |
| 2012/0090952 A1 | 4/2012 | Lee et al. |
| 2012/0145505 A1 | 6/2012 | Kimes |
| 2012/0145506 A1 | 6/2012 | Samie et al. |
| 2012/0152683 A1 | 6/2012 | Kimes |
| 2012/0152687 A1 | 6/2012 | Kimes et al. |
| 2014/0190785 A1 | 7/2014 | Fetting et al. |
| 2014/0378266 A1 | 12/2014 | Bockenstette et al. |
| 2015/0000442 A1 | 1/2015 | Kimes et al. |
| 2015/0001023 A1 | 1/2015 | Kimes et al. |
| 2015/0014116 A1 | 1/2015 | Kimes et al. |
| 2015/0105205 A1 | 4/2015 | Kurosaki et al. |
| 2015/0211587 A1 | 7/2015 | Kimes et al. |
| 2016/0047439 A1 | 2/2016 | Kimes et al. |
| 2016/0129864 A1 | 5/2016 | Essenmacher |
| 2016/0131205 A1 | 5/2016 | Essenmacher |
| 2016/0131206 A1 | 5/2016 | Essenmacher |
| 2016/0160941 A1 | 6/2016 | Green et al. |
| 2016/0160942 A1 | 6/2016 | Shioiri et al. |
| 2016/0186818 A1 | 6/2016 | Shioiri et al. |
| 2016/0223072 A1 | 8/2016 | Miyake |
| 2016/0230819 A1 | 8/2016 | Shioiri et al. |
| 2016/0245346 A1 | 8/2016 | Shioiri et al. |
| 2016/0250917 A1 | 9/2016 | Shibata et al. |
| 2016/0265605 A1 | 9/2016 | Tomita et al. |
| 2016/0273595 A1 | 9/2016 | Shioiri et al. |
| 2016/0290416 A1 | 10/2016 | Hibino |
| 2016/0339775 A1 | 11/2016 | Shioiri et al. |
| 2016/0339908 A1 | 11/2016 | Komada et al. |
| 2016/0341263 A1 | 11/2016 | Shioiri et al. |
| 2016/0348742 A1 | 12/2016 | Yasui et al. |
| 2016/0363179 A1 | 12/2016 | Yasui et al. |
| 2016/0369855 A1 | 12/2016 | Essenmacher |
| 2016/0375754 A1 | 12/2016 | Kurosaki et al. |
| 2016/0377126 A1 | 12/2016 | Essenmacher |
| 2017/0002877 A1 | 1/2017 | Shioiri et al. |
| 2017/0037914 A1 | 2/2017 | Hibino et al. |
| 2017/0050636 A1 | 2/2017 | Shibata et al. |
| 2017/0059033 A1 | 3/2017 | Shioiri et al. |
| 2017/0066317 A1 | 3/2017 | Kurosaki et al. |

SELECTABLE ONE-WAY CLUTCH

CROSS REFERENCE TO RELATED APPLICATIONS

The present application claims priority to and incorporates by reference the entire contents of U.S. provisional patent application 62/457,469, filed on Feb. 10, 2017.

BACKGROUND

The present disclosure relates to a selectable one-way clutch.

As a one-way clutch, U.S. Pat. No. 6,571,926 discloses a selectable one-way clutch including a pocket plate including a plurality of pockets in which struts are accommodated, a notch plate including a plurality of notches to be engaged with the struts, and a selector plate arranged between the pocket plate and the notch plate, and which switches an engaged state and a non-engaged state.

Here, in the above-described selectable one-way clutch, while the notch plate is rotated at a high speed in an engaging direction (positive direction) with respect to the pocket plate, the selector plate may be erroneously rotated for some reason and the struts may be erroneously engaged with the notches in the notch plate rotated at a high speed.

Therefore, to protect components from a shock due to the erroneous engagement, a conventional selectable one-way clutch is provided with a function to suppress the erroneous engagement by flipping the strut by a portion other than the notches in the notch plate (hereinafter, the function is referred to as "ratchet function") when the notch plate is rotated in the engaging direction by the fixed number of revolutions or more.

However, in a conventional selectable one-way clutch 101, as illustrated by a portion A in FIG. 10, an upper surface 13a of a strut 13 may stick to a plane portion 122 between notches 121 adjacent along a peripheral direction due to surface tension of oil (illustration is omitted) lying between a notch plate 120 and the strut 13, when the notch plate 120 flips the strut 13 (hereinafter, referred to as "at the time of ratchet").

Figure 10:
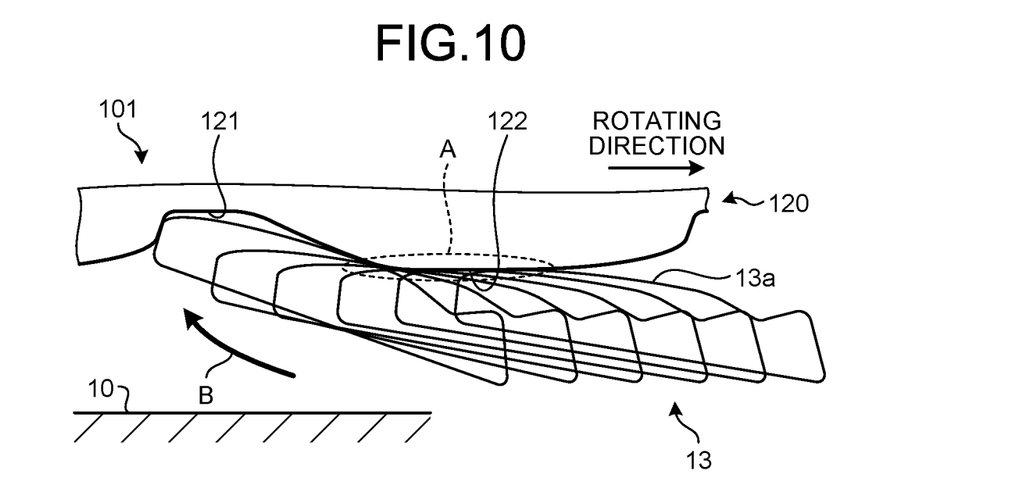
FIG. 10 is a diagram illustrating configurations of a notch plate and a strut of a selectable one-way clutch according to a conventional technology.

As a result, as illustrated by the arrow B in FIG. 10, the strut 13 is drawn into the notch 121 with the rotation of the notch plate 120 and may be erroneously engaged with the notch 121. Note that, in FIG. 10, a plurality of contours of the strut 13 in motion is superimposed in order to illustrate change of the posture of the strut 13 at the time of ratchet in time series in order from the right.

There is a need for a selectable one-way clutch that may suppress occurrence of erroneous engagement due to a strut being draw into a notch at the time of ratchet.

SUMMARY

A selectable one-way clutch according to one aspect of the present disclosure may include: a pocket plate including a plurality of accommodating recess portions formed along a peripheral direction of one surface; a notch plate relatively rotatable with respect to the pocket plate, and including a plurality of engaging recess portions along a peripheral direction of a surface facing the surface where the accommodating recess portions of the pocket plate are formed; a plate-shaped engaging piece accommodated in the accommodating recess portion; and a selector plate arranged between the pocket plate and the notch plate, and configured to be coaxially rotated with the pocket plate to switch between: a state in which the engaging piece rises toward the notch plate; and a state in which the engaging piece is accommodated in the accommodating recess portion, wherein the notch plate includes, between the engaging recess portions adjacent along the peripheral direction, a plane portion parallel to the one surface of the pocket plate, the plane portion includes a first inclined surface, and the first inclined surface provides the engaging piece with force in a direction into which the engaging piece is urged away from the notch plate, when the notch plate is rotated in an engaging direction into which the engaging piece rising toward the notch plate is engaged with the engaging recess portion, and one end portion of the engaging piece rises toward the notch plate and comes in contact with the plane portion.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

A selectable one-way clutch (hereinafter, referred to as SOWC) according to embodiments of the present disclosure will be described with reference to the drawings. Note that the present disclosure is not limited to the embodiments below. Further, configuration elements in the embodiments below include elements easily replaceable by a person skilled in the art and elements substantially the same.

First Embodiment

Figure 1:
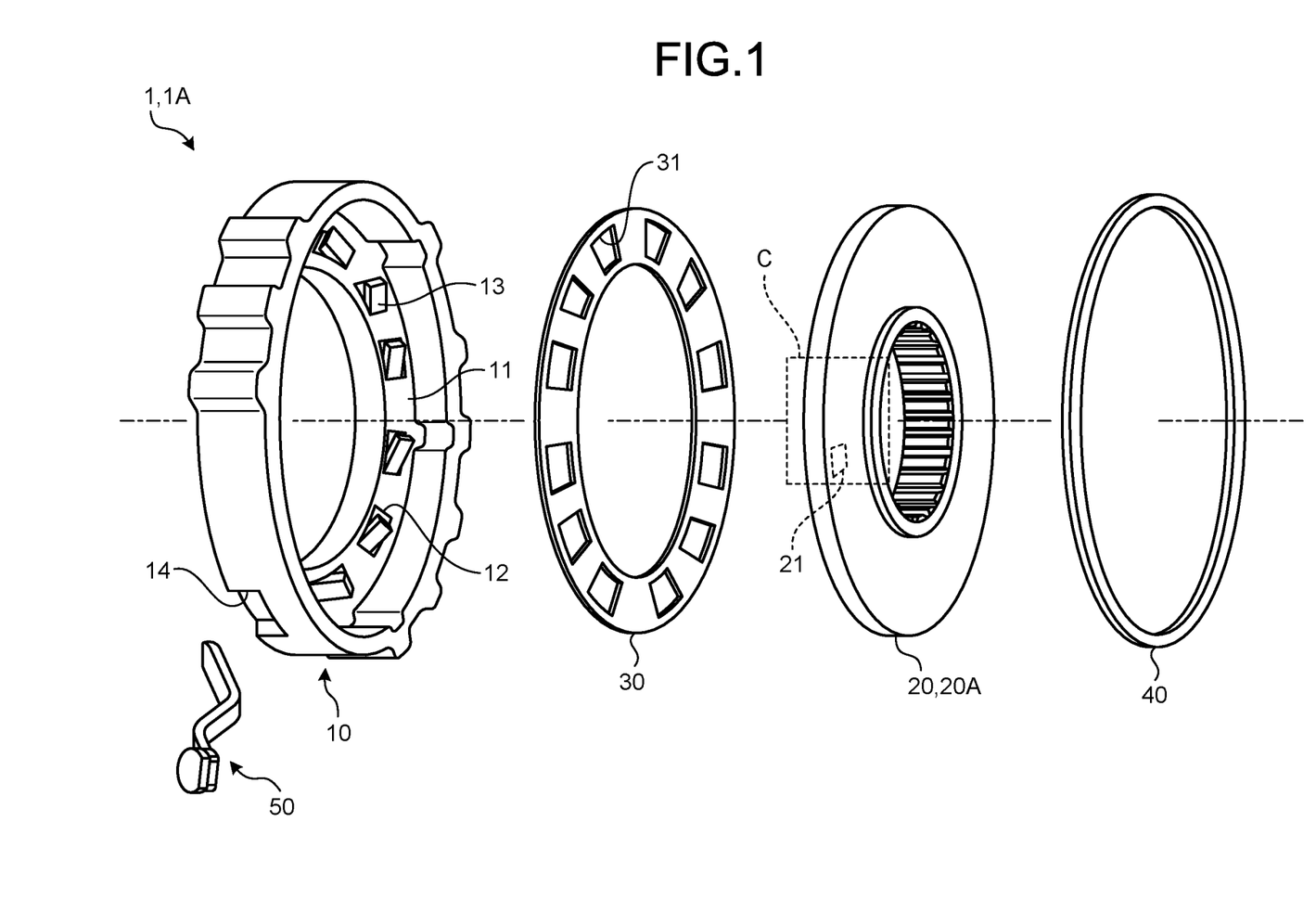
FIG. 1 is an exploded perspective view illustrating an entire configuration of a selectable one-way clutch according to an embodiment of the present disclosure.

An SOWC 1 is mounted on a power transmission device in a hybrid vehicle, for example, and is configured to be able to switch an engaged state (locked state) and a non-engaged state (unlocked state) by rotating a switching member (a selector plate described below) arranged between a fixation-side race (a pocket plate described below) and a rotation-side rage (a notch plate described below). As illustrated in FIG. 1, the SOWC 1 includes a pocket plate 10, a notch plate 20, a selector plate 30, a snap ring 40, and an arm 50.

The pocket plate 10 is formed into a cylindrical shape, and a flange portion 11 extending toward an inner periphery is formed in one end in an axial direction in the cylinder. In the SOWC 1, the selector plate 30 and the notch plate 20 are sequentially arranged on the flange portion 11, and the snap ring 40 is finally attached, so that the members are integrally assembled.

Note that lubrication oil (illustration is omitted) lies inside the SOWC 1, that is, among the pocket plate 10, the selector plate 30, and the notch plate 20. Further, the "axial direction" means a rotation axis direction of the notch plate 20 illustrated by the long dashed short dashed line in FIG. 1.

A plurality of pockets (accommodating recess portions) 12 depressed in the axial direction (plate thickness direction) is formed in one surface of the pocket plate 10, that is, a surface of the flange portion 11. The pockets 12 are formed at predetermined intervals along a peripheral direction of the surface of the flange portion 11. Further, plate-shaped struts (engaging pieces) 13 are accommodated inside the pockets 12. Note that an elastic member (illustration is omitted) that biases the strut 13 toward the notch plate 20 is arranged between a bottom portion of the pocket 12 and the strut 13.

As described below, the strut 13 is configured to have its posture switched by rotation of the selector plate 30. Then, the strut 13 is engaged with a notch 21 under a predetermined condition to regulate rotation of the notch plate 20.

A notch portion 14 is formed in an outer periphery of the pocket plate 10. When a rod-shaped arm 50 is inserted into the notch portion 14, the arm 50 and the selector plate 30 are connected. Note that the arm 50 is connected with an actuator (not illustrated), and is driven by the actuator to rotate the selector plate 30.

The notch plate 20 is formed into an annular shape (hollow disk shape) with an outer diameter equal to the flange portion 11 of the pocket plate 10. Further, the notch plate 20 is arranged to face the surface of the pocket plate 10, where the pockets 12 are formed, and is configured to be relatively rotatable with respect to the pocket plate 10.

A plurality of notches (engaging recess portions) 21 depressed in the plate thickness direction is formed in a surface of surfaces of the notch plate 20, the surface facing the surface of the pocket plate 10, where the pockets 12 are formed. The notch 21 is a recess portion to be engaged with one end portion of the strut 13 that has passed through a window hole 31 of the selector plate 30 and has risen toward the notch plate 20. The notches 21 are formed at predetermined intervals along a peripheral direction of a surface facing the surface of the pocket plate 10, where the pockets 12 are formed.

The selector plate 30 is formed into an annular shape (hollow disk shape), and is arranged to face the pocket plate 10 and the notch plate 20. Further, the window hole 31 penetrating the selector plate 30 in the plate thickness direction is formed in the selector plate 30.

The selector plate 30 is coaxially rotated with the pocket plate 10 by a predetermined angle to switch a state (engaged state) in which the strut 13 rises toward the notch plate 20 and is engaged with the notch 21, and a state (non-engaged state) in which the strut 13 is accommodated in the notch 21.

For example, when the position of the window hole 31 and the position of the pocket 12 are roughly machined in the peripheral direction of the SOWC 1, the one end portion of the strut 13 is pressed by the elastic member (illustration is omitted), and passes through the window hole 31 and rises toward the notch plate 20. Then, when the notch plate 20 is rotated in an engaging direction (positive direction) with respect to the pocket plate 10 in the state where the one end portion of the strut 13 rises toward the notch plate 20, the strut 13 is engaged with the notch 21, and the SOWC 1 becomes in the engaged state. In this engaged state, the strut 13 is engaged with the notch 21, so that torque is transmitted between the pocket plate 10 and the notch plate 20.

Meanwhile, when the position of the window hole 31 is shifted with respect to the position of the pocket 12 in the peripheral direction of the SOWC 1, the pocket 12 is closed by a portion of the selector plate 30, where no window hole 31 is formed and the strut 13 is pushed into the pocket 12 by the portion where no window hole 31 is formed, and the entire strut 13 is accommodated in the pocket 12. Accordingly, the SOWC 1 becomes in the non-engaged state. In this non-engaged state, the strut 13 is not engaged with the notch 21 (the engagement between the strut 13 and the notch 21 is cancelled), so that the torque is not transmitted between the pocket plate 10 and the notch plate 20.

Here, as described above, the conventional SOWC 101 has a problem that the strut 13 sticks to the plane portion 122 due to the surface tension of the oil at the time of ratchet and is drawn into the notch 121 with the sticking, and is thus erroneously engaged with the notch 121 in the notch plate 120 rotated at a high speed (see FIG. 10). Such a problem significantly occurs especially when the temperature of the oil is low and the oil has high viscosity. Therefore, in the SOWC 1 according to the present embodiment, the shape of the notch plate 20 is formed into a shape by which the strut 13 is not drawn into the notch 21, as illustrated in FIGS. 2 and 3.

Figure 2:
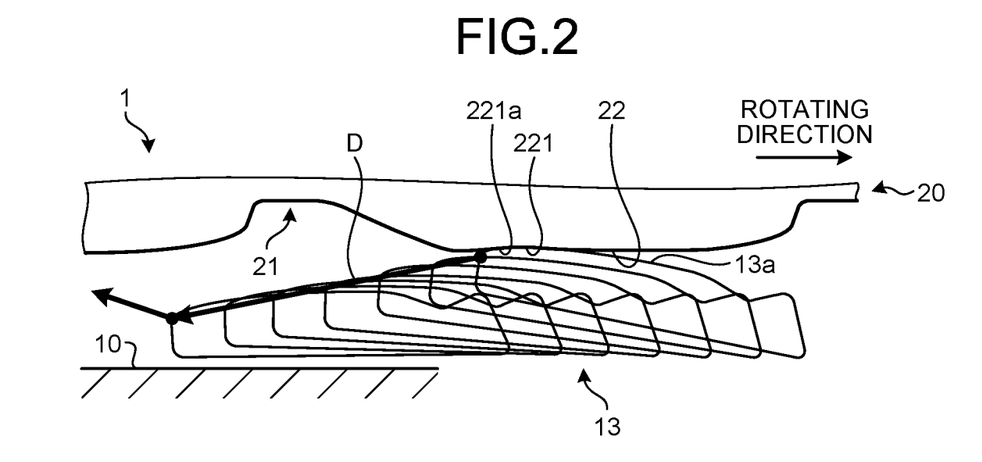
FIG. 2 is a diagram illustrating configurations of a notch plate and a strut of the selectable one-way clutch according to the first embodiment of the present disclosure.

To be specific, as illustrated in FIG. 2, in the notch plate 20 of the SOWC 1 according to the present embodiment, a plane portion 22 parallel to the surface (flange portion 11) of the pocket plate 10, where the pockets 12 are formed, is included between the notches 21 adjacent along the peripheral direction. Then, an inclined surface (first inclined surface) 221a is formed in the plane portion 22.

Figure 3:
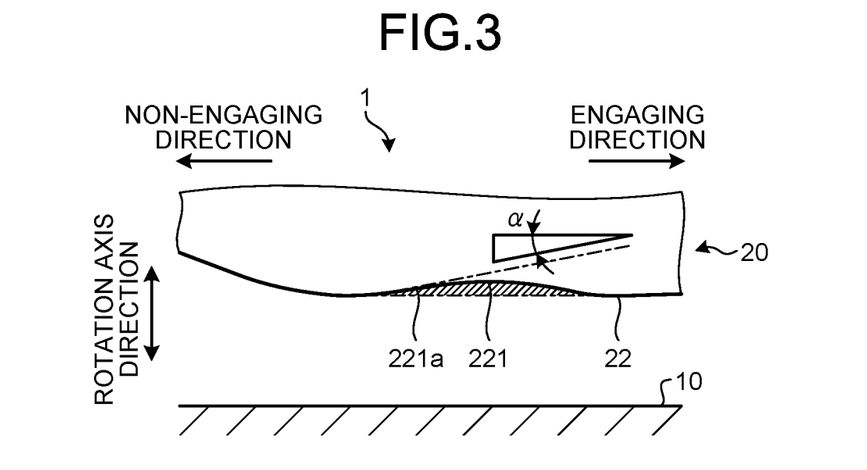
FIG. 3 is a diagram for describing a recess portion and an inclined surface in the notch plate of the selectable one-way clutch according to the first embodiment of the present disclosure.

The plane portion 22 according to the present embodiment includes a recess portion 221 having a predetermined depth in a part of the plane, as illustrated in FIG. 3, unlike the conventional plane portion 122 (see FIG. 10) configured with a plane as a whole. Then, in the notch plate 20, an inner surface of the recess portion 221 configures the inclined surface 221a. The inclined surface 221a is formed in every plane portion 22 in the notch plate 20, and a plurality of the inclined surfaces 221a is formed in the peripheral direction of the notch plate 20. Note that the hatched portion illustrated in the recess portion 221 in FIG. 3 indicates the contour of the shape of the conventional plane portion 122.

As illustrated in FIG. 2, the inclined surface 221a provides the strut 13 with force in a direction (a downward direction in FIG. 2) into which the strut 13 is away from the notch plate 20 at the time of ratchet, that is, when the notch plate 20 is rotated in an engaging direction (see the "rotating direction" in FIG. 2) into which the strut 13 rising toward the notch plate 20 is engaged with the notch 21, and the one end portion of the strut 13 rises toward the notch plate 20 and comes in contact with the plane portion 22. Note that the arrow D in FIG. 2 indicates a locus of the one end portion of the strut 13 in motion.

Further, as illustrated in FIG. 3, the inclined surface 221a is inclined by a predetermined angle α with respect to a plane part of the plane portion 22 within an angle range between a reverse direction (non-engaging direction) to the engaging direction, of the rotating direction of the notch plate 20, and a direction from the plane portion 22 toward the pocket plate 10, of the rotation axis direction of the notch plate 20. The inclination direction of the inclined surface 221a is the same direction as an inclination direction of a meshing surface 211 of the notch 21 (see FIG. 4) described below. Note that the "plane part of the plane portion 22" indicates a portion where no recess portion 221 is formed in the plane portion 22, as illustrated in FIG. 3.

The SOWC 1 includes such an inclined surface 221a, thereby to separate the strut 13 from the notch plate 20 side to the pocket plate 10 side when the strut 13 passes through the inclined surface 221a even if the notch plate 20 is rotated in a state where the strut 13 sticks to the plane portion 22 at the time of ratchet.

As illustrated in FIG. 3, the inclined surface 221a may have a linear shape or a curved shape when the notch plate 20 is viewed from a radial direction. When the inclined surface 221a has the curved shape, an angle made by a tangential line of a tip end (the notch 21 side) of the inclined surface 221a and the plane part of the plane portion 22 is the above-described predetermined α.

Figure 4:
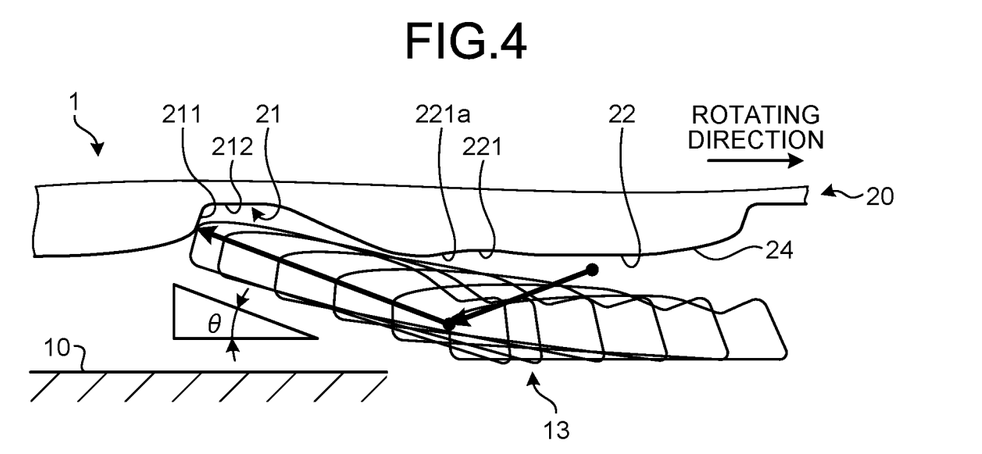
FIG. 4 is a diagram for describing a minimum angle at which the strut of the selectable one-way clutch according to the first embodiment of the present disclosure may reach a meshing surface.

Here, as illustrated in FIG. 4, the notch 21 includes a meshing surface 211 inclined in a direction from a bottom surface 212 of the notch 21 toward the pocket plate 10, and with which the strut 13 comes in contact when engaged with the notch 21. Then, as illustrated in FIG. 4, the inclined surface 221a is set within a range (θ>α(>0)) that is smaller than a minimum angle θ with respect to the plane part of the plane portion 22, at which the strut 13 may reach the meshing surface 211, in a situation where the strut 13 reaches the meshing surface 211 after flipped by an inclined surface 24 of the notch plate 20. Note that the "minimum angle θ" is determined according to the shapes of the notch 21 and the strut 13.

Figure 5:
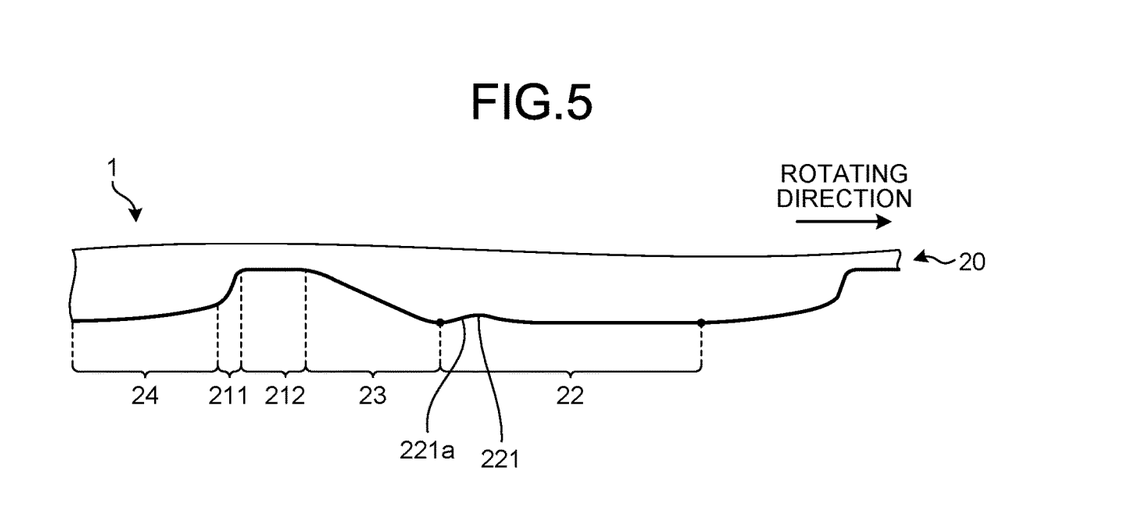
FIG. 5 is a diagram for describing a forming position of the recess portion in the notch plate of the selectable one-way clutch according to the first embodiment of the present disclosure.

Further, as illustrated in FIG. 5, the notch plate 20 includes an inclined surface (second inclined surface) 23 inclined from the plane portion 22 toward the bottom surface 212 of the notch 21, between the notch 21 and the plane portion 22. Then, as illustrated in FIG. 5, the inclined surface 221a is formed in a position closest to the inclined surface 23 in the plane portion 22. Note that the "inclined surface 23" is used to flip the strut 13 toward the pocket plate 10 (overrun ramp) when the strut 13 rises due to an erroneous operation of the selector plate 30 (an overrun) when the notch plate 20 is rotated at a high speed in the non-engaging direction (negative direction).

Since the SOWC 1 includes the inclined surface 221a formed in the position that is an end edge of the plane portion 22, the strut 13 is sure to pass through the inclined surface 221a even if sticking of the strut 13 occurs in any position in the plane portion 22. Therefore, the strut 13 may be reliably separated from the notch plate 20 side to the pocket plate 10 side at the time of ratchet.

Note that, as illustrated in FIG. 5, the notch plate 20 includes an inclined surface (third inclined surface) 24 between the meshing surface 211 and the plane portion 22. This inclined surface 24 is use to flip the strut 13 toward the pocket plate 10 at the time of ratchet where the strut 13 rises due to an erroneous operation of the selector plate 30, when the notch plate 20 is rotated at a high speed in the engaging direction (positive direction) (ratchet ramp).

Figure 6:
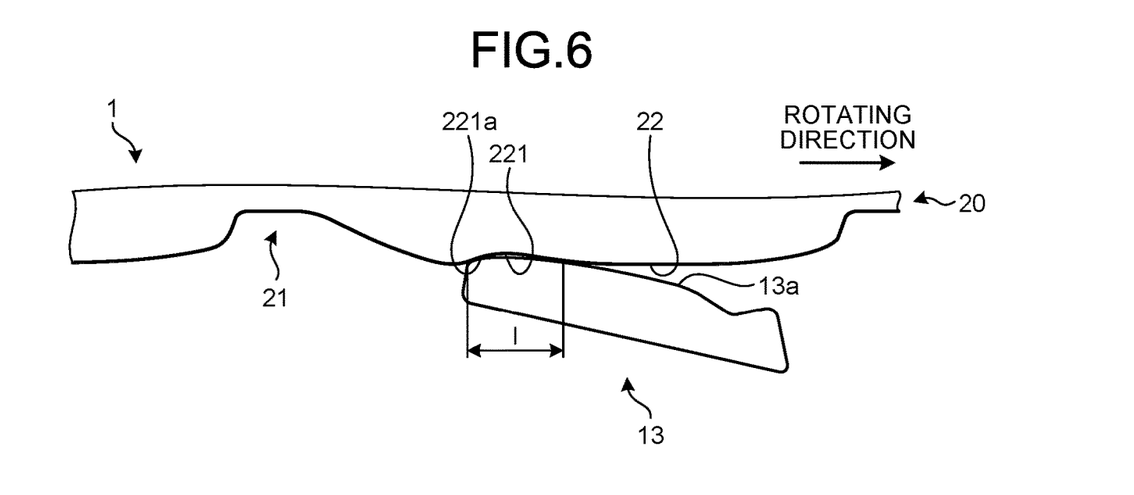
FIG. 6 is a diagram for describing a length of the recess portion in the notch plate of the selectable one-way clutch according to the first embodiment of the present disclosure.

As illustrated in FIG. 6, the length of the recess portion 221 that configures the inclined surface 221a is formed into a length l in which an upper surface 13a of the strut 13 may enter in the rotating direction of the notch plate 20. This length l is determined according to the shape and the length of the strut 13.

The SOWC 1 having the above configuration may provide the strut 13 with the force in the direction into which the strut 13 is away from the notch plate 20, when the strut 13 passes through the inclined surface 221a, that is, when the strut 13 gets over the inclined surface 221a, even if the notch plate 20 is rotated in the state where the strut 13 sticks to the plane portion 22 at the time of ratchet. Accordingly, the SOWC 1 may generate the force in the reverse direction to the force that draws the strut 13 into the notch 21, and may separate the strut 13 from the notch plate 20 side to the pocket plate 10 side. Therefore, according to the SOWC 1, occurrence of the erroneous engagement due to the strut 13 being drawn into the notch 21 may be suppressed.

Note that the "direction into which the strut 13 is away from the notch plate 20" may be rephrased to a direction to pushing down the strut 13 from the notch plate 20 side to the pocket plate 10 side, or a rising direction of the strut 13.

Second Embodiment

In the above SOWC 1, the recess portion 221 is formed in the plane portion 22, and the inner surface of the recess portion 221 is used as the inclined surface 221a (see FIG. 2). However, an inclined surface may be formed by another method.

Figure 7:
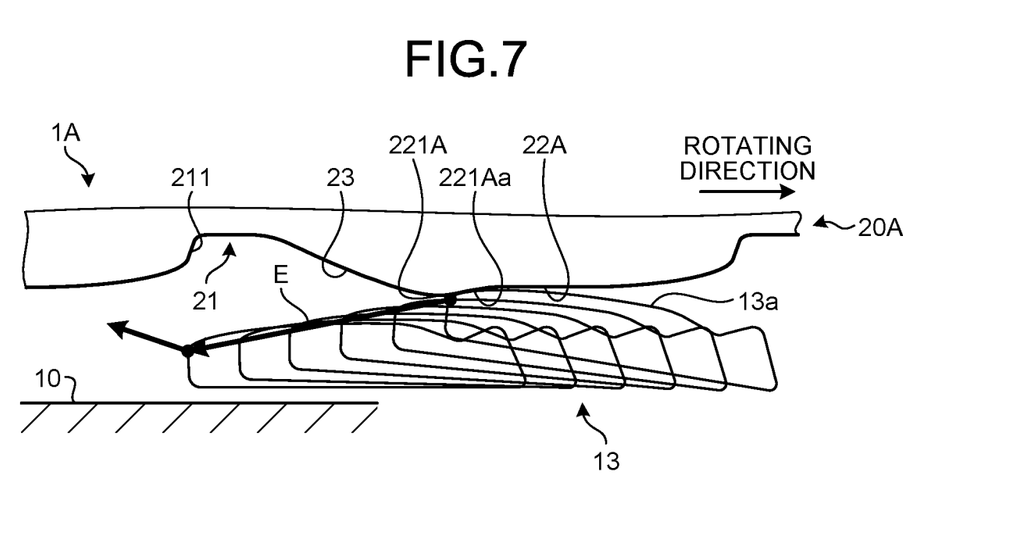
FIG. 7 is a diagram illustrating configurations of a notch plate and a strut of a selectable one-way clutch according to a second embodiment of the present disclosure.

As illustrated in FIG. 7, in a notch plate 20A of an SOWC 1A according to a second embodiment, a plane portion 22A parallel to a surface (flange portion 11) of a pocket plate 10, where pockets 12 are formed, is included between notches 21 adjacent along a peripheral direction. Then, an inclined surface (first inclined surface) 221Aa is formed in the plane portion 22A.

Figure 8:
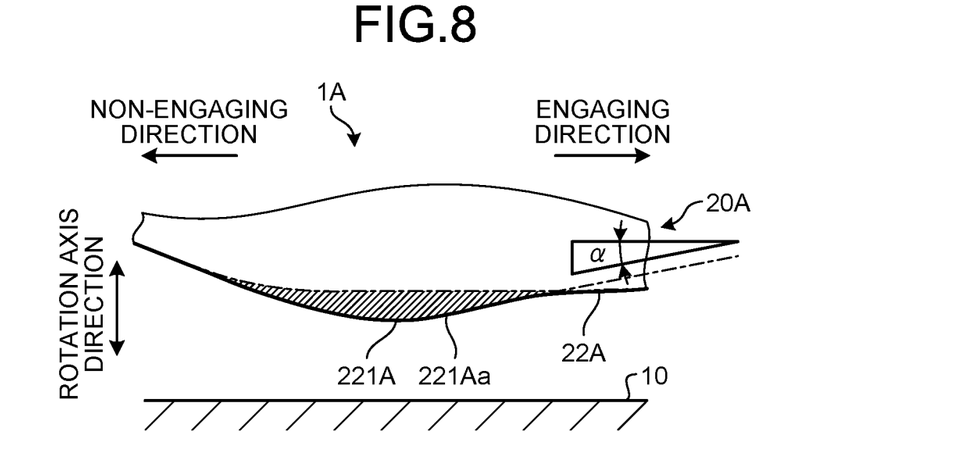
FIG. 8 is a diagram for describing a recess portion and an inclined surface in the notch plate of the selectable one-way clutch according to the second embodiment of the present disclosure.
Figure 9:
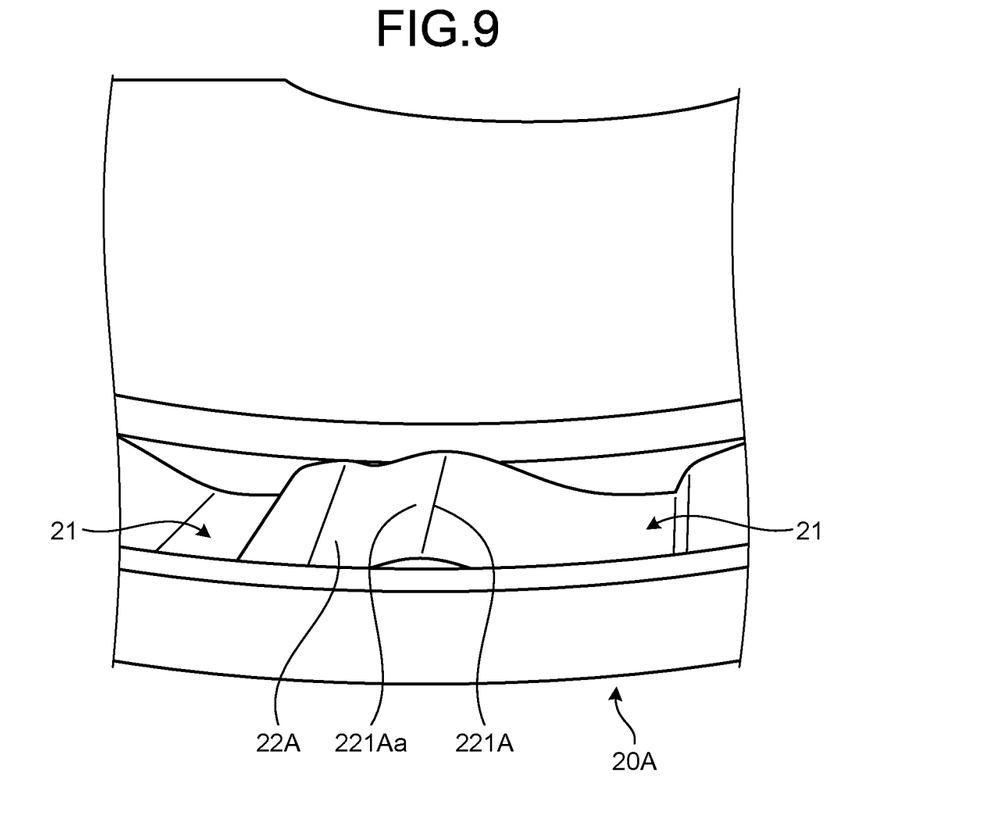
FIG. 9 is a perspective view illustrating configurations of the recess portion and the inclined surface in the notch plate of the selectable one-way clutch according to the second embodiment of the present disclosure.

The plane portion 22A according to the present embodiment includes a protruding portion 221A having a predetermined height in a part of the plane, as illustrated in FIGS. 8 and 9, unlike the conventional plane portion 122 (see FIG. 10) configured with a plane as a whole. Then, in the notch plate 20A, an outer surface of the protruding portion 221A configures the inclined surface 221Aa. The inclined surface 221Aa is formed in every plane portion 22A in the notch plate 20A, and a plurality of the inclined surfaces 221Aa is formed in the peripheral direction of the notch plate 20A. Note that the hatched portion illustrated in the protruding portion 221A of FIG. 8 indicates a contour of the shape of the conventional plane portion 122.

Note that FIG. 9 is a diagram illustrating the C portion in FIG. 1 from a selector plate 30 side.

The inclination direction of the inclined surface 221Aa is similar to that of the inclined surface 221a (see FIG. 2). That is, as illustrated in FIG. 7, the inclined surface 221Aa provides force in a direction (downward direction in FIG. 7 into which a strut 13 is away from the notch plate 20A, at the time of ratchet, that is, when the notch plate 20A is rotated in an engaging direction (see the "rotating direction" in FIG. 7) into which the strut 13 rising toward the notch plate 20A is engaged with the notch 21, and an end portion of the strut 13 rises toward the notch plate 20A and comes in contact with the plane portion 22A. Note that the arrow E in FIG. 7 indicates a locus of the one end portion of the strut 13 in motion.

As illustrated in FIG. 8, the inclined surface 221Aa is inclined at a predetermined angle α with respect to a plane part of the plane portion 22A, within an angle range between a non-engaging direction of the rotating direction of the notch plate 20A, and a direction from the plane portion 22A toward the pocket plate 10, of a rotation axis direction of the notch plate 20A. Note that the inclined surface 221Aa may have a linear shape or a curved shape when the notch plate 20 is viewed from a radial direction, as illustrated in FIG. 8, similarly to the inclined surface 221a.

In this way, the inclined surface 221Aa has a function to flip the strut 13 toward the pocket plate 10, the strut 13 being about to stick to the plane portion 22A due to surface tension of oil lying between the notch plate 20A and the strut 13, and suppress the sticking of the strut 13 to the plane portion 22A, at the time of ratchet.

The inclined angle and the forming position of the inclined surface 221Aa are similar to those of the inclined surface 221a (see FIGS. 4 and 5). That is, the inclined surface 221Aa is set within a range (θ>α(>0)) that is smaller than a minimum angle θ at which the strut 13 may reach a meshing surface 211, and is formed in a position closest to the inclined surface 23 in the plane portion 22A.

The SOWC 1A having the above configuration may provide the strut 13 with the force in the direction away from the notch plate 20A at the time of ratchet, similarly to the SOWC 1, and thus may suppress occurrence of the erroneous engagement due to the strut 13 being drawn into the notch 21.

According to the present disclosure, the selectable one-way clutch may separate the engaging piece from the notch plate side to the pocket plate side by providing the engaging piece with force in a direction away from the notch plate, when the engaging piece passes through the first inclined surface even if the notch plate is rotated in a state where the engaging piece sticks to the plane portion.

Moreover, the first inclined surface may be inclined within an angle range between a reverse direction to the engaging direction, of a rotating direction of the notch plate, and a direction from the plane portion toward the pocket plate, of a rotation axis direction of the notch plate, with respect to a plane part of the plane portion.

Accordingly, the selectable one-way clutch may include the first inclined surface inclined within the predetermined angle range, thereby to separate the engaging piece from the notch plate side to the pocket plate side when the engaging piece passes through the first inclined surface.

Moreover, the notch plate may include, between the engaging recess portion and the plane portion, a second inclined surface inclined from the plane portion toward a bottom surface of the engaging recess portion, and the first inclined surface may be formed in a position adjacent to the second inclined surface, in the plane portion.

Accordingly, the selectable one-way clutch may include the first inclined surface formed in the position that is an end edge of the plane portion, and thus the engaging piece is sure to pass through the first inclined surface even if the sticking of the engaging piece occurs in any position of the plane portion. Therefore, the engaging piece may be reliably separated from the notch plate side to the pocket plate side.

Moreover, the engaging recess portion may include a meshing surface inclined in a direction from a bottom surface of the engaging recess portion toward the pocket plate, and with which the engaging piece comes in contact when engaged with the engaging recess portion, and angle of the first inclined surface with respect to the plane part of the plane portion may be smaller than a minimum angle with respect to the plane part of the plane portion, at which the engaging piece is able to reach the meshing surface.

Accordingly, the selectable one-way clutch may include the first inclined surface be less than the predetermined angle, thereby to separate the engaging piece from the notch plate side to the pocket plate side when the engaging piece passes through the first inclined surface.

Moreover, the plane portion may include a recess portion, and the first inclined surface is configured with an inner surface of the recess portion.

Accordingly, the selectable one-way clutch may include the first inclined surface configured with the inner surface of the recess portion, thereby to separate the engaging piece from the notch plate side to the pocket plate side when the engaging piece passes through the first inclined surface.

Moreover, the plane portion may include a protruding portion, and the first inclined surface is configured with an outer surface of the protruding portion.

Accordingly, The selectable one-way clutch may include the first inclined surface configured with the outer surface of the protruding portion, thereby to separate the engaging piece from the notch plate side to the pocket plate side when the engaging piece passes through the first inclined surface.

[Advantageous Effects of Disclosure]

According to the selectable one-way clutch of the present disclosure, the engaging piece may be separated from the notch plate side to the pocket plate side by providing the engaging piece with the force in the direction away from the notch plate at the time of ratchet. Therefore, occurrence of erroneous engagement due to the engaging piece being drawn into the engaging recess portion may be suppressed.

As described above, the selectable one-way clutch according to the present disclosure has been specifically described by the forms for implementing the disclosure. However, the gist of the present disclosure is not limited to the description, and should be broadly construed on the basis of the description of claims. In addition, it goes without saying that various changes and alternations based on the description are also included in the gist of the present disclosure.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A selectable one-way clutch comprising:
   a pocket plate including a plurality of accommodating recess portions formed along a peripheral direction of one surface;
   a notch plate relatively rotatable with respect to the pocket plate, and including a plurality of engaging recess portions along a peripheral direction of a bottom surface facing the one surface where the accommodating recess portions of the pocket plate are formed;
   a plate-shaped engaging piece accommodated in the accommodating recess portion; and
   a selector plate arranged between the pocket plate and the notch plate, and configured to be coaxially rotated with the pocket plate to switch between: a state in which the engaging piece rises toward the notch plate; and a state in which the engaging piece is accommodated in the accommodating recess portion, wherein the bottom surface including a planar portion and a first inclined surface forming a portion of one of the plurality of engaging recess portions, the planar portion being located adjacent to the first inclined surface in an engaging direction, and the first inclined surface provides the engaging piece with force in a direction into which the engaging piece is urged away from the notch plate, when the notch plate is rotated in the engaging direction into which the engaging piece rising toward the notch plate is engaged with the one of the plurality of engaging recess portions having the first inclined surface formed therein, and one end portion of the engaging piece rises toward the notch plate and comes in contact with the planar portion.

2. The selectable one-way clutch according to claim 1, wherein the notch plate includes a second inclined surface forming a portion of another of the plurality of engaging recess portions, the second inclined surface inclined from a portion of the bottom surface of the notch plate toward a bottom surface of the another of the plurality of engaging recess portions.

3. The selectable one-way clutch according to claim 2, wherein the bottom surface of the notch plate includes a protruding portion extending between the second inclined surface of the another of the plurality of engaging recess portions and the one of the plurality of engaging recess portions having the first inclined surface.

4. The selectable one-way clutch according to claim 1, wherein another of the plurality of engaging recess portions includes a meshing surface inclined in a direction from a bottom surface of the another of the plurality of engaging recess portions toward the pocket plate, and with which the engaging piece comes in contact when engaged with the another of the plurality of engaging recess portions.

* * * * *